United States Patent [19]

Ikeda et al.

[11] 4,367,012

[45] Jan. 4, 1983

[54] OPTICAL GLASS FIBER HAVING COVER GLASS OF SODIUM ZINC ALUMINO BOROSILICATE

[75] Inventors: Yoshirou Ikeda; Yoshikazu Kaite, both of Nishinomiya; Toshiro Ikuma, Amagasaki, all of Japan

[73] Assignee: Nippon Sheet Glass Co., Ltd., Osaka, Japan

[21] Appl. No.: 219,535

[22] Filed: Dec. 23, 1980

Related U.S. Application Data

[63] Continuation of Ser. No. 81,257, Oct. 2, 1979, abandoned.

[30] Foreign Application Priority Data

Oct. 6, 1978 [JP] Japan ................ 53-123721

[51] Int. Cl.³ .................. C03C 3/08; C03C 13/00; G02B 5/14
[52] U.S. Cl. .................. 350/96.34; 501/37; 501/67; 501/79; 501/903
[58] Field of Search .............. 106/50, 54; 350/96.34, 350/96.33, 96.31, 96.29; 501/37, 67, 79, 903

[56] References Cited

U.S. PATENT DOCUMENTS

| | | | |
|---|---|---|---|
| 1,143,732 | 6/1915 | Schott | 106/54 |
| 3,784,386 | 1/1974 | Araujo et al. | 350/96.34 X |
| 3,951,671 | 4/1976 | Parry et al. | 106/54 X |
| 3,957,342 | 5/1976 | Newns et al. | 350/96.34 |
| 4,194,807 | 3/1980 | Gliemeroth | 350/96.31 X |
| 4,210,386 | 7/1980 | Araujo et al. | 350/96.34 |
| 4,243,299 | 1/1981 | Gliemeroth et al. | 350/96.34 |
| 4,264,131 | 4/1981 | Sawamura et al. | 350/96.34 |
| 4,275,951 | 6/1981 | Beales et al. | 350/96.31 |
| 4,277,270 | 7/1981 | Krohn | 350/96.31 X |
| 4,277,271 | 7/1981 | Krohn | 350/96.31 X |

FOREIGN PATENT DOCUMENTS

| | | |
|---|---|---|
| 51-29524 | 10/1976 | Japan. |
| 53-03352 | 1/1978 | Japan. |
| 214055 | 5/1968 | U.S.S.R. ............ 350/96.34 |

*Primary Examiner*—Helen M. McCarthy
*Attorney, Agent, or Firm*—Wenderoth, Lind & Ponack

[57] ABSTRACT

This invention provides a light-transmitting glass having superior weatherability which has the following composition in % by weight:

| | |
|---|---|
| $SiO_2$ | 38–70 |
| $B_2O_3$ | 4–22 |
| $Na_2O$ | 8–24 |
| $K_2O$ | 0–15 |
| $Li_2O$ | 0–15 |
| $Cs_2O$ | 0–15 |
| $Al_2O_3$ | 1–22 |
| $ZnO$ | 1–16 |
| $TiO_2$ | 0–7 |
| $ZrO_2$ | 0–7 |
| $CaO$ | 0–7 |
| $BaO$ | 0–7 |
| $MgO$ | 0–7 | provided that $Na_2O + K_2O + Li_2O + Cs_2O$ is 13 to 24, and $Al_2O_3 + ZnO + TiO_2 + ZrO_2 + CaO + BaO + MgO$ is 2 to 32.

The aforesaid multicomponent glass exhibits superior water resistance even when used as a covering ingredient of a light-transmitting glass fiber.

5 Claims, No Drawings

OPTICAL GLASS FIBER HAVING COVER GLASS OF SODIUM ZINC ALUMINO BOROSILICATE

This is a continuation of application Ser. No. 81,257, filed Oct. 2, 1979, now abandoned.

This invention relates to a multicomponent glass for light-transmitting bodies having superior weatherability.

Generally, a glass fiber for light transmission is composed of a core glass and around it, a covering glass having a slightly lower refractive index than the core glass. A light-transmitting glass body in which the refractive index of the core glass is uniform along the radial direction of the cross section of the core glass is called a step-type glass fiber. The step-type glass fiber transmits a light information coming from one end thereof to the other end while wholly reflecting it in the interface between the core glass and the cover glass. A light-transmitting glass body in which the refractive index of the core glass progressively decreases in the radial direction of the cross section of the core glass is also known. This type of glass body is called a converged-type (focusing-type) glass fiber. Light rays which come into the end surface of optical axis of the glass fiber parallel to the optical axis advance on the optical axis and are transmitted to the other end, and other light rays are transmitted to the other end while moving like a sine curve around the light axis. Since the difference in phase between the light rays which have arrived at the other end is small, the converged-type glass fiber is known to enable light transmission over a wide range.

Communication methods using a light-transmission glass fiber as a light path have recently been rapidly exploited because of their superior characteristics such as light weight, non-induction, non-leakage, low loss and large capacity, and have come into commercial acceptance. The technological advance in this field has led to the determination of both optical and mechanical characteristics which glass fibers should possess in such an application.

One very important characteristic required of glass fibers for light-transmission paths is superior weatherability, especially superior water resistance in a high-temperature high-humidity atmosphere, since the light-transmitting path is exposed to a natural environment.

In producing lgass fibers as a light-transmitting path in a communication system, it is the usual practice to cover the outside surface of ordinary glass fibers with a synthetic resin layer through two or three turns, gathering a plurality of the covering glass fibers, and further covering the assembly with a synthetic resin, rubber, etc. to form a glass fiber cable. The covering material such as a synthetic resin, rubber, etc. is effective for preventing direct exposure of the glass surface to the outer atmosphere. However, after a lapse of a long period of time, moisture or vapor in the outer atmosphere permeates the covering material, and as a result, comes into contact with the glass fibers used as a light-transmitting path. Thus, when the glass fibers have low water resistance, the surfaces of the glass fibers are gradually attacked by moisture, and the optical properties and mechanical strength of the glass fibers will be deteriorated. To produce a glass fiber cable for light transmission having superior water resistance, the covering glass which forms at least the outermost layer of each constituent glass fiber should have superior water resistance.

Multicomponent glasses and silica glasses doped with germanium oxide, phosphorus oxide, etc. are known as materials for light-transmitting glass fibers. The silica glasses have a superior water resistance. The multicomponent glasses are suitable for the production of optical glass fibers having a high numerical aperture because a variety of glass compositions can be employed, and there is large room for the selection of glasses which will give a large difference in refractive index between the core glass and the covering glass. Moreover, the multicomponent glasses have characteristics suitable for mass production as is seen in the case of optical glasses and sheet glasses. These characteristics are also very important for commercial production of glass fibers.

Numerous multicomponent glasses for light transmission have been suggested heretofore, but all of them still have room for improvement in water resistance.

Typical glass compositions of these known multicomponent glasses are as follows:

(1) Multicomponent glasses containing $SiO_2$, $Na_2O$ and $CaO$ as main ingredients.

(2) Multicomponent glasses containing $SiO_2$, $Na_2O$ and $PbO$ as main ingredients.

(3) Multicomponent glasses containing $SiO_2$, $GeO_2$ and $R_2O$ ($R_2O$ ($R_2O$ is an alkali metal oxide such as $Na_2O$ or $K_2O$).

(4) Multicomponent glasses containing $SiO_2$, $Na_2O$, and $B_2O_3$ as main ingredients.

The core glass and covering glass for light-transmitting glass fibers are produced by properly changing the constituent proportions of these multicomponent glasses.

These conventional multicomponent glasses, however, have one or more defects. Glass fibers produced from the multicomponent glass (1) have poor water-resisting properties. To improve their water-resisting properties, it is necessary to introduce $Al_2O_3$, $MgO$, etc. as is well known in the sheet glass industry. However, the introduction of these components abruptly increases the melting temperature of glass and the temperature suitable for working, and makes it difficult to produce glass fibers of low losses suitable for light transmission.

Glass fibers produced from the multicomponent glasses (2) have poor water-resisting properties when their $PbO$ content is low. When the $PbO$ content is increased to more than about 20% by weight, the water resistance of the glass fibers can be improved. However, scattering losses of light markedly increase as the $PbO$ content increases, and it is difficult therefore to produce light-transmitting glass fibers of low losses.

Glass fibers produced from the multicomponent glasses (3) have large scattering losses because these glass compositions have a great tendency to crystallization. Consequently, it is difficult to produce light-transmitting glass fibers of low losses from these multicomponent glasses.

The multicomponent glasses (4) have the advantage that the melting temperature of glass is as low as not more than 1300° C., and light absorption losses due to a metallic iron impurity are low. One of the inventors of the present invention worked on the composition of these multicomponent glasses, and already determined a glass composition range which is suitable for the production of converged-type glass fibers (see Japanese Patent Publication No. 29524/76).

Japanese Laid-Open Patent Publication No. 3352/78 also suggests a $SiO_2$-$Na_2O$-$_2O_3$ type multicomponent glass, and discloses a step-type glass fiber for optical communication which comprises as a core ingredient a multicomponent glass composed of 46 to 65% by weight of $SiO_2$, 1 to 5% by weight of $Al_2O_3$, 17 to 23% by weight of an alkali metal chiefly of $Na_2O$, 5 to 12% by weight of CaO, 4 to 15% by weight of $B_2O_3$, and 1 to 12% nby weight of $ZrO_2$.

Investigations of the present inventors have shown that for use as a covering component of a light-transmitting glass fiber, a multicomponent glass of the composition disclosed in Japanese Laid-Open Patent Publication No. 3352/78 does not have sufficient water resistance.

It is an object of this invention therefore to provide a light-transmitting glass comprising a multicomponent glass of $SiO_2$-$Na_2O$-$B_2O_3$ type which has superior weatherability, especially superior water resistance.

Another object of this invention is to provide a light-transmitting glass comprising the aforesaid multicomponent glass which exhibits superior water resistance even when used as a covering ingredient of a light-transmitting glass fiber.

Other objects of this invention will become apparent from the following description.

These objects and advantages of this invention are acheived in accordance with this invention by a light-transmitting glass having superior weatherability which has the following composition in % by weight:

| | |
|---|---|
| $SiO_2$ | 38–70 |
| $B_2O_3$ | 4–22 |
| $Na_2O$ | 8–24 |
| $K_2O$ | 0–15 |
| $Li_2O$ | 0–15 |
| $Cs_2O$ | 0–15 |
| $Al_2O_3$ | 1–22 |
| ZnO | 1–16 |
| $TiO_2$ | 0–7 |
| $ZrO_2$ | 0–7 |
| CaO | 0–7 |
| BaO | 0–7 |
| MgO | 0–7 | provided that $Na_2O+K_2O+Li_2O+Cs_2O$ is 13 to 24, and $Al_2O_3+ZnO+TiO_2+ZrO_2+CaO+BaO+MgO$ is 2 to 32.

The characteristic feature of the composition of the light-transmitting glass of this invention is that it contains $SiO_2$, $B_2O_3$, $Na_2O$, $Al_2O_3$ and ZnO as essential constituent ingredients.

In one preferred embodiment of this invention, the glass comprises 46 to 70% by weight of $SiO_2$, 6 to 20% by weight of $B_2O_3$ and 1 to 15% by weight of $Al_2O_3$.

In another preferred embodiment of this invention, the glass comprises 38 to 57% by weight of $SiO_2$ and from more than 15 to 22% by weight of $Al_2O_3$.

The characteristic feature of the first embodiment is that the resulting glass has superior water resistance, and it is easy to adjust the viscosity of the glass to a value suitable for a combination of a core glass and a covering glass.

The second embodiment is characterized by the fact that the glass has superior water resistance, and the reduction in strength upon contact of the glass with water is extremely low.

Additionally, the glass of this invention for light transmission may contain $K_2O$, $Li_2O$, $Cs_2O$, $TiO_2$, $ZrO_2$, CaO, BaO and MgO as optional ingredients.

The five essential ingredients are required in order to impart the various characteristics to be described below to the light-transmitting glass. Above all, ZnO, coupled with $Al_2O_3$, is essential for imparting very good water resistance to the glass of this invention.

The optional ingredients mentioned above are used to impart additional characteristics to the light-transmitting glass. They should not be taken as mere optional ingredients, but should be taken as selected ingredients for imparting additional properties to the glass composed of the five essential ingredients without impairing its superior characteristics.

The light-transmitting glass of this invention contains the aforesaid ingredients in proportions within the above-specified ranges.

The reasons for the limitation of the contents of the cnstituent ingredients are described below. It should be understood that these reasons are in terms of the characteristics of the glass.

$SiO_2$

This is a main ingredient of the multicomponent glass of $SiO_2$—$B_2O_3$—$Na_2O$ type of this invention, which is essential for imparting various practical characteristics to glass. $SiO_2$ can be incorporated in an amount of 38 to 70% by weight. If the proportion is less than 38% by weight, the water resistance of the glass is very inferior. On the other hand, when the $SiO_2$ content exceeds 70% by weight, the glass melting temperature becomes exceedingly high. Thus, it is difficult to obtain a low-loss glass, and there is a markedly increased tendency to the crystallization of glass.

Having regard to $Al_2O_3$ as another essential ingredient, the $SiO_2$ content is preferably 46 to 70% by weight when the $Al_2O_3$ content is 1 to 15% by weight, and 38 to 57% by weight when the $Al_2O_3$ content is more than 15% by weight but not more than 22% by weight. A glass composition having a relatively large content of $Al_2O_3$ within the latter range generally shows a markedly small decrease in strength upon contact with water.

$B_2O_3$

The glass of this invention contains $B_2O_3$ in a proportion of 4 to 22% by weight. If the $B_2O_3$ content is less than 4% by weight, the water resistance of the glass is markedly reduced, and at the same time, the melting temperature of glass becomes too high. Also, there is an abrupt increase in the tendency of the glass to crystallize. If the $B_2O_3$ content exceeds 22% by weight, the water resistance of glass is markedly reduced.

Alkali Metal Oxides

The alkali metal oxides used in this invention are $Na_2O$, $K_2O$, $Li_2O$ and $Cs_2O$. $Na_2O$ is an essential ingredient, and can be included in a proportion of 8 to 24% by weight, $K_2O$, $Li_2O$ and $Cs_2O$, additional ingredients, may be included so that the total amount of the alkali metal oxides is within the range of 13 to 24% by weight. The upper limit of the amount of each of these additional alkali metal oxides is 15% by weight.

These alkali metal oxides facilitate melting of glass. If the total content of these oxides exceeds 24% by weight, or if the amount of either $K_2O$, $Li_2O$ or $Cs_2O$ exceeds 15% by weight, the water resistance of glass will become very low. On the other hand, when the total amount of the four alkali metal oxides is less than 13% by weight, or when the $Na_2O$ content is less than 8% by weight, the tendency to phase separation and crystallization inherent to a $B_2O_3$—$SiO_2$—$Na_2O$ multicomponent glass rapidly increases.

This tendency is seen also in compositions which have a relatively large content of $K_2O$ and or $Li_2O$. Thus, preferably, each of $K_2O$ and $Li_2O$ is used in an amount of not more than 10% by weight, especially not more than 6% by weight.

$Al_2O_3$

The glass of this invention contains 1 to 22% by weight of $Al_2O_3$. When the $SiO_2$ content is relatively low within the above-specified range, the $Al_2O_3$ content should preferably be 15 to 22% by weight, and when the $SiO_2$ content is relatively high, the $Al_2O_3$ content should preferably be 2 to 10% by weight. $Al_2O_3$ is an important ingredient for improving the water resistance of glass. If its amount is less than 1% by weight, its effect is small. When its content exceeds 22% by weight, the melting temperature of glass becomes exceedingly high, and the melting of glass and its drawing by a double pot method are difficult.

$Al_2O_3$ is an essential ingredient for improving the water resistance of glass in combination with $SiO_2$. When the total amount of $Al_2O_3$ and $SiO_2$ exceeds 72% by weight, the tendency to crystal precipitation and the tendency to increased viscosity increase to make it difficult to melt the glass and draw it by a double pot method. Preferably, therefore, a total amount of $Al_2O_3$ and $SiO_2$ should be not more than 72% by weight.

ZnO

The glass of this invention contains 1 to 16% by weight of ZnO. The co-presence of ZnO with $Al_2O_3$ produces an effect of markedly improving the weatherability, especially water resistance, of glass. The degree of the improving effect will become apparent in Examples to be given hereinbelow.

If the amount of ZnO is less than 1% by weight, this effect will not be obtained. If it exceeds 16% by weight, the crystallization tendency of glass will undesirably increase. The preferred amount of ZnO is 2 to 14% by weight.

$TiO_2$, $ZrO_2$, CaO, BaO and MgO $TiO_2$, $ZrO_2$, CaO, BaO and MgO are not essential ingredients, but additional ingredients that may be included in the glass of this invention.

Each of these ingredients may be added in an amount of not more than 7% by weight. If the total amount of $Al_2O_3$, ZnO and $R_mO_n$ (in which $R_mO_n$ is at least one of $TiO_2$, $ZrO_2$, CaO, BaO and MgO) exceeds 32% by weight, the crystallizing tendency of glass will rapidly increase undesirably. Moreover, when the amount of each of $TiO_2$, $ZrO_2$, CaO, BaO and MgO exceeds 7% by weight, the crystallizing tendency of glass will undesirably increase. Since the content of ZnO, $TiO_2$, $ZrO_2$, CaO, or BaO affects the refractive index of glass, it should be determined depending upon the optical characteristics required of a light-transmitting glass body to be produced. If the contents of these additional ingredients fall outside the specified ranges, light-transmitting glass bodies of high quality cannot be obtained.

Thus, the present invention provides a glass for light transmission which has superior weatherability, especially water resistance.

Light-trasmitting glass fibers can be produced from the glass of this invention by known methods such as a double crucible method or a pipe rod method (i.e. a rod-in-tube method).

The double crucible method comprises maintaining a core glass and a covering glass in the molten state in an inside crucible and an outside crucible respectively which are disposed concentrically, allowing the molten core glass and the molten covering glass to flow naturally from orifices at the lower ends of the inside and outside crucibles, and drawing the flowing glasses to form an optical glass fiber. According to this method, a converged-type glass fiber can be produced by providing a space between the end portions of the inside and outside crucibles so that the lower end of the inside crucible is positioned inside, and at the upper portion of the lower end of the outside crucible. The molten glass which flows from the lower end of the inside crucible and is to become the core glass is covered with the molten glass which flows from the lower end of the outside crucible and is to become the covering glass, and they are contacted so that a thallium ion, etc. in the molten core glass is exchanged with a sodium ion, etc. of the molten covering glass.

A step-type glass fiber can also be produced by the aforesaid method if no sufficient space is provided between the lower end portion of the inside crucible and that of the outside crucible.

A step-type glass fiber can be produced by the pipe-rod method or the rod-in-tube method, which comprises inserting a round rod of core glass into a pipe of covering glass, and heating and stretching the assembly so that imperfections such as bubbles may not remain in the interface between the core glass and the covering glass.

The glass of this invention can be used either as a covering component or a core component of such a light-transmitting glass fiber. However, it is especially useful as a covering component of a light-transmitting glass fiber because of its excellent water resistance.

The following Examples illustrate the present invention in greater details.

EXAMPLES 1 to 23 AND COMPARATIVE EXAMPLE 1

Each of 24 glasses having the different compositions shown in Table 1 were melted in an electric furnace using a quartz crucible. In performing the melting of the glass, less than 1 part by weight of $As_2O_3$ or $Sb_2O_3$ was used per 100 parts by weight of the glass in order to remove imperfections ascribable to melting, such as bubbles.

The water resistance of each of the samples prepared from the molten glasses was evaluated by the following two methods.

(1) JIS R-3502

This is a method for testing glass instruments for chemical analysis. The glass sample is crushed and glass particles which pass through a 420 micron screen but remain on a 250 micron screen are collected. 2.5 g of the particles are put into 50 cc of boiling distilled water, and heated for 60 minutes. The amount of alkali that dissolves in distilled water is measured. The amount in grams of the dissolved alkali based on 2.5 g of the glass sample is expressed in percent.

(2) Method Developed by the Present Inventors

A glass rod having a diameter of 2 to 3 mm is drawn from a molten liquid of a glass to be tested. A silicone resin coating is applied to the surface of the glass rod and then baked, care being taken not to contaminate the surface by dust, etc. The silicone-coated glass rod is dipped in hot water at 90° C. and taken out after a lapse of a certain period of time. The surface of the glass rod is observed microscopically to determine when a deposit (mainly alkaline component) is formed on the surface of the glass. The water resistance of the glass is better when a longer period of time is required for the deposit to be formed on the glass surface.

The results are shown in Table 1.

In Examples 26, 27, 29 and 30, step-type glass fibers were obtained using the glasses of this invention as a core and a covering.

In Examples 24, 25 and 28, the glasses of this invention were used as a covering component. The glass fiber in Example 24 was of the step-type, and the glass fibers of Examples 25 and 28 were of the converged type.

As described in Examples 1 to 23, the glasses of this invention have very good water resistance, and therefore are suitable for use as a covering component of a light-transmitting glass fiber.

The light-transmitting glass fibers obtained in Examples 24 to 30 were subjected to an accelerated deterioration test in warm water at 50° C. to determine a reduction in tensile strength. In any of these light-transmitting glass fibers, a period of as long as 2500 hours or more was required until their tensile strength decreased to

TABLE 1

| Composition (wt. %) | | Comparative Example 1 | Example 1 | 2 | 3 | 4 | 5 | 6 | 7 | 8 | 9 | 10 | 11 |
|---|---|---|---|---|---|---|---|---|---|---|---|---|---|
| $SiO_2$ | | 66 | 67 | 65 | 67 | 64 | 63 | 70 | 64 | 60 | 60 | 51 | 48 |
| $B_2O_3$ | | 11 | 6 | 6 | 6 | 8 | 8 | 8 | 9 | 10 | 10 | 17 | 10 |
| $Na_2O$ | | 10 | 11 | 22 | 22 | 20 | 19 | 17 | 18 | 20 | 19 | 17 | 17 |
| $K_2O$ | | 11 | 11 | — | — | — | — | — | — | — | — | — | — |
| $Al_2O_3$ | | 2 | 1 | 2 | 2 | 5 | 5 | 2 | 3 | 5 | 3 | 3 | 4 |
| ZnO | | — | 4 | 5 | 3 | 3 | 3 | 3 | 1 | 5 | 5 | 12 | 14 |
| $TiO_2$ | | — | — | — | — | — | — | 5 | — | — | — | — | 2 |
| $ZrO_2$ | | — | — | — | — | — | 2 | — | — | — | 3 | — | — |
| CaO | | — | — | — | 2 | — | — | — | — | — | — | — | — |
| Water resistance | (1)* | 0.14 | 0.03 | 0.02 | 0.03 | 0.01 | 0.02 | 0.01 | 0.02 | 0.008 | 0.008 | 0.03 | 0.02 |
| | (2)* | 90 | 390 | 440 | 410 | 486 | 440 | 480 | 408 | 510 | 500 | 410 | 440 |

| Composition (wt. %) | | Example 12 | 13 | 14 | 15 | 16 | 17 | 18 | 19 | 20 | 21 | 22 | 23 |
|---|---|---|---|---|---|---|---|---|---|---|---|---|---|
| $SiO_2$ | | 54 | 52 | 57 | 70 | 54 | 68 | 70 | 51 | 49 | 48 | 46 | 48 |
| $B_2O_3$ | | 13 | 12 | 11 | 8 | 20 | 9 | 8 | 19 | 19 | 18 | 18 | 18 |
| $Na_2O$ | | 10 | 16 | 24 | 20 | 9 | 20 | 19 | 17 | 12 | 16 | 16 | 18 |
| $K_2O$ | | 7 | — | — | — | 9 | — | — | — | 5 | — | — | — |
| $Al_2O_3$ | | 5 | 5 | 5 | 1 | 5 | 1 | 1 | 10 | 10 | 15 | 15 | 3 |
| ZnO | | 1 | 10 | 3 | 1 | 2 | 1 | 1 | 3 | 5 | 3 | 5 | 10 |
| $TiO_2$ | | — | — | — | — | — | — | — | — | — | — | — | — |
| $ZrO_2$ | | 3 | — | — | — | BaO1 | 1 | — | — | — | — | — | 5 |
| CaO | | — | 5 | — | — | — | — | 1 | — | — | — | — | — |
| Water resistance | (1)* | 0.02 | 0.01 | 0.03 | 0.03 | 0.04 | 0.03 | 0.03 | 0.03 | 0.02 | 0.01 | 0.008 | 0.03 |
| | (2)* | 410 | 440 | 390 | 410 | 390 | 390 | 440 | 390 | 440 | 490 | 510 | 390 |

*(1) The percentage of the alkali dissolved based on the weight of glass determined by method (1) described above.
*(2) The time (hours) required for a deposit to form on the glass surface determined by method (2) described above.

The glass of Comparative Example 1 is the same $SiO_2$-$Na_2O$-$B_2O_3$ type glass as the glass of this invention, but differs from it in that it does not contain ZnO.

It is seen from the results shown in Table 1 that the glasses of this invention have far better water resistance than the glass of Comparative Example 1 not containing ZnO.

EXAMPLES 24 TO 30

In each run, a glass fiber for light transmission having an outside diameter of about 150 microns and a core diameter of 100 microns was produced by using a core glass and a covering glass having the composition shown in Table 2.

50% of the initial value. This value is about 10 to 30 times as large as that of light-transmitting fibers made of conventional multicomponent glasses.

It is clear therefore that the glasses of this invention exhibit superior weatherability, especially water resistance.

The glass of this invention, as is seen in Example 24, gives glass fibers suitable for light transmission over a short distance, which contain a commercially available comparatively highly transparent glass as a core component. Furthermore, as is seen in Examples 25 and 28, the glass of this invention is suitable for providing a converged-type glass fiber because it does not hamper the diffusion of an ion such as $Na^+$, $K^+$, $Cs^+$ and $Tl^+$.

TABLE 2

| Composition (wt. %) | 24 Core | 24 Cover (No. 9) | 25 Core | 25 Cover (No. 8) | 26 Core (No. 11) | 26 Cover (No. 4) | 27 Core (No. 13) | 27 Cover (No. 6) | 28 Core | 28 Cover (No. 2) | 29 Core (No. 9) | 29 Cover (No. 18) | 30 Core (No. 23) | 30 Cover (No. 22) |
|---|---|---|---|---|---|---|---|---|---|---|---|---|---|---|
| $SiO_2$ | 44 | 60 | 53 | 60 | 48 | 64 | 52 | 70 | 58 | 65 | 60 | 70 | 48 | 46 |
| $B_2O_3$ | — | 10 | 20 | 10 | 10 | 8 | 12 | 8 | 13 | 6 | 10 | 8 | 18 | 18 |
| $Na_2O$ | 4 | 19 | 17 | 20 | 17 | 20 | 16 | 17 | 23 | 22 | 19 | 19 | 18 | 16 |
| $K_2O$ | 7 | — | — | — | — | — | — | — | — | — | — | — | — | — |
| PbO | 45 | — | — | — | — | — | — | — | — | — | — | — | — | — |
| $Tl_2O$ | — | — | 10 | — | — | — | — | — | 6.5 | — | — | — | — | — |
| $Al_2O_3$ | — | 3 | — | 5 | 4 | 5 | 5 | 2 | — | 2 | 3 | 1 | 3 | 15 |
| ZnO | — | 5 | — | 5 | 14 | 3 | 10 | 3 | — | 5 | 5 | 1 | 10 | 5 |
| $TiO_2$ | — | — | — | — | 2 | — | — | — | — | — | — | — | — | — |
| $ZrO_2$ | — | 3 | — | — | — | — | — | — | — | — | 3 | — | 5 | — |
| CaO | — | — | — | — | — | — | 5 | — | — | — | — | 1 | — | — |
| Characteristics |  |  |  |  |  |  |  |  |  |  |  |  |  |  |
| Refractive index | 1.611 | 1.521 | 1.533 | 1.518 | 1.532 | 1.507 | 1.525 | 1.503 | 1.526 | 1.512 | 1.523 | 1.509 | 1.539 | 1.515 |
| NA (**) | 0.53 |  | 0.21 |  | 0.28 |  | 0.26 |  | 0.21 |  | 0.21 |  | 0.27 |  |
| Light loss dB/km |  |  |  |  |  |  |  |  |  |  |  |  |  |  |
| wave length 0.63 μm | 220 |  | 16 |  | 18 |  | 22 |  | 15 |  | 12 |  | 25 |  |
| Wave length 0.83 μm | 60 |  | 7 |  | 8 |  | 8 |  | 7 |  | 6 |  | 10 |  |
| Type of light-transmitting glass fibers | Step |  | Converged |  | Step |  | Step |  | Converged |  | Step |  | Step |  |

(*) The parenthesized numbers correspond to Example numbers.
(**) NA: Aperture number

EXAMPLES 31 TO 43 AND COMPARATIVE EXAMPLES 2 TO 4

In the same way as in Examples 1 to 23, glasses having the compositions shown in Table 3 were produced, and tested for water resistance.

These glasses were maintained at 950° C. for 17 hours, and their devitrifying tendency was examined. Glasses in which no devitrifying tendency was observed were rated "excellent," and those in which a devitrifying tendency was observed but which were not devitrified during drawing by a double crucible method were rated "good".

The results are also shown in Table 3.

TABLE 3

| Composition (wt. %) | Comparative Example 2 | 3 | 4 | Example 31 | 32 | 33 | 34 | 35 | 36 | 37 |
|---|---|---|---|---|---|---|---|---|---|---|
| $SiO_2$ | 66 | 51 | 53 | 42 | 40 | 42 | 44 | 45 | 42 | 45 |
| $B_2O_3$ | 8 | 14 | 15 | 16 | 16 | 16 | 18 | 17 | 16 | 17 |
| $Na_2O$ | 15 | 15 | *30 | 14 | 16 | 15 | 16 | 10 | 14 | 15 |
| $K_2O$ | 10 | — | — | — | — | — | — | 5 | — | — |
| $Al_2O_3$ | *1 | — | — | 20 | 18 | 17 | 15 | 15 | 20 | 15 |
| ZnO | — | — | — | 8 | 5 | 5 | 5 | 5 | 6 | 8 |
| $TiO_2$ | — | — | — | — | — | — | — | 3 | — | — |
| $ZrO_2$ | — | — | 2 | — | — | — | 2 | — | — | — |
| CaO | — | *10 | — | — | — | 5 | — | — | — | — |
| BaO | — | *10 | — | — | — | — | — | — | 2 | — |
| MgO | — | — | — | — | 5 | — | — | — | — | — |
| Water resistance (1)* | 0.20 | 0.21 | 0.40 | 0.009 | 0.011 | 0.012 | 0.011 | 0.010 | 0.013 | 0.006 |
| (2)* | 40 | 50 | 20 | 600 | 480 | 440 | 490 | 570 | 430 | 980 |
| Devitrifying tendency | Excellent | Excellent | Excellent | Excellent | Excellent | Excellent | Excellent | Excellent | Excellent | Excellent |

| Composition (wt. %) | Example 38 | 39 | 40 | 41 | 42 | 43 |
|---|---|---|---|---|---|---|
| $SiO_2$ | 44 | 45 | 54 | 39 | 42 | 42 |
| $B_2O_3$ | 18 | 17 | 7 | 11 | 13 | 13 |
| $Na_2O$ | 10 | 15 | 10 | 20 | 10 | 8 |
| $K_2O$ | 6 | — | 12 | — | — | — |
| $Al_2O_3$ | 16 | 18 | 15 | 15 | 15 | 17 |
| ZnO | 6 | 5 | 2 | 14 | 3 | 2 |
| $TiO_2$ | — | — | — | — | — | 6 |
| $ZrO_2$ | — | — | — | — | 5 | — |
| CaO | — | — | — | 1 | — | — |

TABLE 3-continued

|  |  |  |  |  |  |  |
|---|---|---|---|---|---|---|
| BaO | — | — | — | — | 5 | — |
| MgO | — | — | — | — | — | — |
|  |  |  |  |  | Li$_2$O | Cs$_2$O |
|  |  |  |  |  | 7 | 12 |
| Water resistance (1)* | 0.010 | 0.011 | 0.020 | 0.010 | 0.029 | 0.031 |
| (2)* | 540 | 500 | 420 | 530 | 410 | 400 |
| Devitrifying tendency | Excellent | Excellent | Good | Excellent | Good | Excellent |

*Same as the footnote to Table 1.

Glasses in Comparative Examples 2 to 4 did not contain ZnO. Moreover, the glass in Comparative Example 2 contained Al$_2$O$_3$ in a smaller amount than in Examples 31 to 43. The glass of Comparative Example 3 contained larger amounts of CaO and BaO than are specified in this invention. The glass of Comparative Example 4 contained a larger amount of Na$_2$O than is specified in this invention.

It is seen from the results shown in Table 3 that the glasses of this invention (Examples 31 to 43) have far better water resistance than the glasses of Comparative Examples 2 to 4 which did not contain ZnO.

EXAMPLES 44 TO 47

Table 4 summarizes the compositions and properties of light-transmitting glass fibers which were produced in the same way as in Examples 24 to 30 using the glasses of Examples 31, 33, 36 and 37 as covering components.

Example 47 shows a light-transmitting body for short distances containing a commercially available comparatively highly transparent glass as a core component. Example 46 shows a converged-type glass fiber, and Examples 44 and 45 show step-type glass fibers.

From the properties of the light-transmitting glass fibers shown in Table 4, it is seen that the glass of this invention is excellent for use in light transmission.

The light-transmitting glass fibers in Examples 44 to 47 showed very good water resistance. For example, in an accelerated deterioration test in warm water at 50° C., the light-transmitting glass fiber of Example 45 required a period of more than 30,000 hours for its tensile strength to decrease to 50% of the initial value.

TABLE 4

|  | Example | | | | | | | |
|---|---|---|---|---|---|---|---|---|
|  | 44 | | 45 | | 46 | | 47 | |
|  | Glass (*) | | | | | | | |
| Composition (wt. %) | Core | Cover (No. 36) | Core | Cover (No. 37) | Core | Cover (No. 33) | Core | Cover (No. 31) |
| SiO$_2$ | 31 | 42 | 50 | 45 | 53 | 42 | 43 | 42 |
| B$_2$O$_3$ | 12 | 16 | 19 | 17 | 20 | 16 | — | 16 |
| Na$_2$O | 11 | 14 | 17 | 15 | 17 | 15 | 3 | 14 |
| K$_2$O | — | — | — | — | — | — | 6 | — |
| PbO | — | — | — | — | — | — | 45 | — |
| Tl$_2$O | — | — | — | — | 10 | — | — | — |
| Al$_2$O$_3$ | — | 20 | — | 15 | — | 17 | 3 | 20 |
| ZnO | — | 6 | — | 8 | — | 5 | — | 8 |
| TiO$_2$ | — | — | — | — | — | — | — | — |
| ZrO$_2$ | 11 | — | 5 | — | — | — | — | — |
| CaO | — | — | — | — | — | 5 | — | — |
| BaO | 35 | 2 | 8 | — | — | — | — | — |
| MgO | — | — | — | — | — | — | — | — |
| Characteristics |  |  |  |  |  |  |  |  |
| Refractive index | 1.621 | 1.510 | 1.537 | 1.518 | 1.538 | 1.517 | 1.608 | 1.518 |
| NA | 0.58 | | 0.24 | | 0.25 | | 0.53 | |
| Light loss dB/km |  |  |  |  |  |  |  |  |
| Wavelength 0.63 μm | 15 | | 12 | | 14 | | 140 | |
| Wavelength 0.83 μm | 9 | | 5 | | 6 | | 41 | |
| Type of the light transmitting glass fibers | Step | | Step | | Converged | | Step | |

(*) The parenthesized numbers correspond to the Example numbers.

What is claimed is:

1. A light-transmitting glass fiber having a core and a cover for the core, said cover being a multicomponent glass composition consisting of, in % by weight based on the total weight of SiO$_2$, B$_2$O$_3$, Na$_2$O, Al$_2$O$_3$ and ZnO:

| SiO$_2$ | 46–70 |
|---|---|
| B$_2$O$_3$ | 6–19 |
| Na$_2$O | 16–24 |
| Al$_2$O$_3$ | 2–15, and |
| ZnO | 3–12, and | in parts by weight per 100 parts by total weight of the aforesaid components:

| | |
|---|---|
| Sb$_2$O$_3$ | 0 - less than 1, or |
| As$_2$O$_3$ | 0 - less than 1, | provided that Al$_2$O$_3$+ZnO is 5 to 20%.

2. A light-transmitting glass fiber having a core and a cover for the core, said cover being a multicomponent glass composition consisting of, in % by weight based on the total weight of SiO$_2$, B$_2$O$_3$, Na$_2$O, Al$_2$O$_3$ and ZnO:

| | |
|---|---|
| SiO$_2$ | 60 |
| B$_2$O$_3$ | 10 |
| Na$_2$O | 20 |
| Al$_2$O$_3$ | 5, and |
| ZnO | 5, and | in parts by weight per 100 parts by total weight of the aforesaid components:

| | |
|---|---|
| As$_2$O$_3$ or Sb$_2$O$_3$ | less than 1. |

3. A light-transmitting glass fiber having a core and a cover for the core, said cover being a multicomponent glass composition consisting of, in % by weight based on the total weight of SiO$_2$, B$_2$O$_3$, Na$_2$O, Al$_2$O$_3$ and ZnO:

| | |
|---|---|
| SiO$_2$ | 45 |
| B$_2$O$_3$ | 17 |
| Na$_2$O | 15 |
| Al$_2$O$_3$ | 15, and |
| ZnO | 8, and | in parts by weight per 100 parts by total weight of the aforesaid components:

| | |
|---|---|
| As$_2$O$_3$ or Sb$_2$O$_3$ | less than 1. |

4. A light-transmitting glass fiber having a core and a cover for the core, said cover being a multicomponent glass composition consisting of, in % by weight based on the total weight of SiO$_2$, B$_2$O$_3$, Na$_2$O, Al$_2$O$_3$ and ZnO:

| | |
|---|---|
| SiO$_2$ | 42 |
| B$_2$O$_3$ | 16 |
| Na$_2$O | 14 |
| Al$_2$O$_3$ | 20, and |
| ZnO | 8, and | in parts by weight per 100 parts by total weight of the aforesaid components:

| | |
|---|---|
| As$_2$O$_3$ or Sb$_2$O$_3$ | less than 1. |

5. A light-transmitting glass fiber having a core and a cover for the core, said cover being a multicomponent glass composition consisting of, in % by weight based on the total weight of SiO$_2$, B$_2$O$_3$, Na$_2$O, Al$_2$O$_3$ and ZnO:

| | |
|---|---|
| SiO$_2$ | 45 |
| B$_2$O$_3$ | 17 |
| Na$_2$O | 15 |
| Al$_2$O$_3$ | 18, and |
| ZnO | 5, and | in parts by weight per 100 parts by total weight of the aforesaid components:

| | |
|---|---|
| As$_2$O$_3$ or Sb$_2$O$_3$ | less than 1. |

* * * * *